Patented Apr. 5, 1949

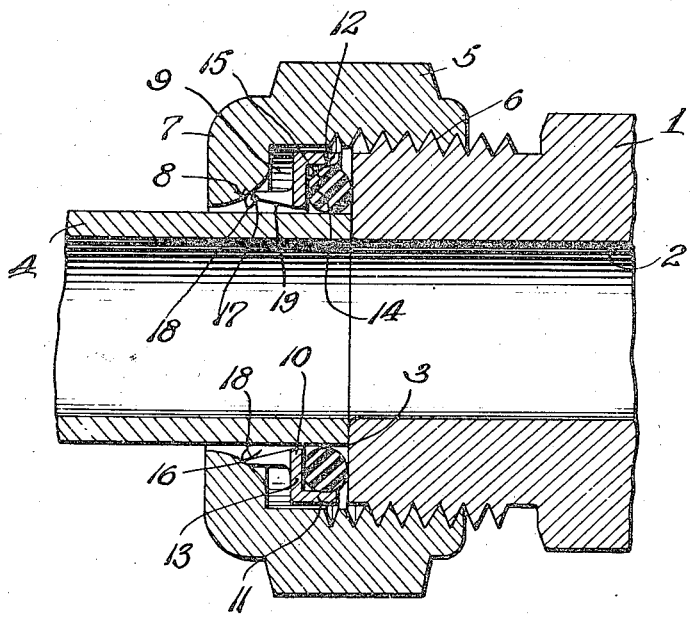
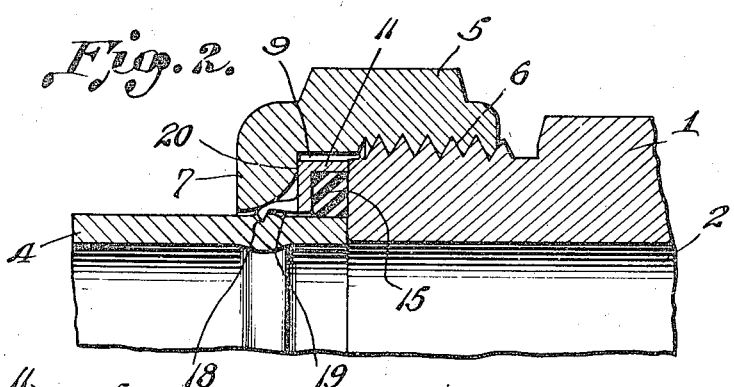
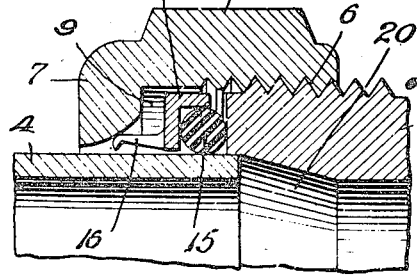

2,466,527

UNITED STATES PATENT OFFICE 2,466,527

COUPLING FOR FLARELESS TUBES

John N. Wolfram, Cleveland, Ohio, assignor to The Parker Appliance Company, Cleveland, Ohio, a corporation of Ohio Application November 30, 1944, Serial No. 565,885

4 Claims. (Cl. 285—122)

The invention relates to new and useful improvements in a coupling for tubes and more particularly a coupling for securing a tube to a body member, which tube is flareless.

An object of the invention is to provide a coupling wherein the tube is seated against the end of the body member and the holding and sealing devices for joining the tube to the body member are all housed within a nut attached to the body member.

A further object of the invention is to provide a coupling of the above type wherein the tube is gripped and held by mechanical devices engaging the same back from the end thereof and a sealing gasket for sealing the connection is disposed between the mechanical gripping devices and the inner end of the tube.

These and other objects will in part be obvious and will in part be hereinafter more fully disclosed.

In the drawings which show by way of illustration one embodiment of the invention, Figure 1 is a longitudinal sectional view through the coupling with the nut joined to the body member with finger tightness;

Figure 2 is a view similar to Figure 1 but showing the coupling closed and the tube gripped and the seal between the tube and the coupling completed.

Figure 3 is a view similar to Figure 1 of a modified form of body member.

In the present embodiment of the invention the coupling includes a body member 1 which may be attached in any suitable way to a fixed part or to another tube. Said body member has a bore 2 therethrough which is of uniform diameter all the way to the end 3 of the body member. This bore 2 is of substantially the same diameter as the bore of the tube 4 which is to be attached to the body member.

The coupling also includes a nut 5 which has a threaded connection 6 with the body member. This threaded connection is shown on the external surface of the body member 1. It is obvious, however, that it may be otherwise formed. The nut has an inwardly extending flange 7 at its outer end, which flange is formed with an opening to receive the tube 4. The wall surrounding the opening for the tube is curved so as to provide a camming surface 8.

This flange 7 of the nut is spaced away from the body member so as to provide a recess 9. Disposed in the recess 9 is a holding sleeve 10. This holding sleeve at its inner end is offset outwardly away from the tube, thus providing a cylindrical wall 11, the inner surface 12 of which is substantially parallel with the outer face of the tube. The outwardly extending portion 13 of the sleeve has a surface 14 which is substantially at right angles to the face of the tube and also substantially at right angles to the surface 12. This forms a recess in which is disposed a ring gasket member 15 made of deformable material such as rubber or the like. This gasket, as shown, is circular in cross section.

The sleeve 10 has the outer portion thereof slotted to form gripping fingers 16. Each gripping finger has an outer rounded face 17 terminating in a sharp cutting edge 18. The sleeve immediately adjacent the sharp edge 18 is preferably cut away as indicated at 19.

The tube to be joined to the body member abuts against the end of the body member and does not extend into any bore formed in the body member. In the assembling of the parts the nut is slipped onto the tube, then the sleeve, and then the gasket, and the tube may be moved laterally into engagement with the end of the body member. No springing or bending of the tube is necessary for the reason that the end of the tube does not engage within the body member, but only abuts against the inner end thereof.

In Figure 1 the nut is shown as threaded onto the body member with finger tightness. The gasket is so dimensioned that it makes a contact with the tube and with the surface 12 of the sleeve. The wall 11 of the sleeve is less in length than the diameter of the gasket so that the gasket will likewise contact with the surface 14 and the end of the body member before the wall 11 engages said body member. The nut will at this time engage the rounded surface of the gripping fingers. As the nut is turned onto the body member, the sleeve will be forced along the tube and the gasket compressed and deformed into tight sealing engagement with the tube, the end of the body member and both the surfaces 12 and 14.

When the wall 11 contacts with the body member, the sleeve cannot move any further along the tube and this limits the extent of deformation of the ring gasket. It also provides a closed recess so that there are no spaces into which the ring gasket may be extruded by pressure on the line passing between the end of the tube and the seat and contacting with the deformable gasket. The only space leading from this recess is whatever minute clearance there may be between the sleeve and the tube.

After the wall 11 is contacted with the body member so that the sleeve cannot move along the nut, as it is threaded onto the body member, will move up onto the gripping fingers. The camming surface 8 on the nut will slide along the rounded surface of the fingers and this will force the gripping fingers inwardly and cause the cutting edge 18 to dig into the tube as shown in Figure 2. The flange 7 of the nut will finally contact with the sleeve at the line 20 and this will limit any further contraction of the finger portion of the sleeve. While it is preferable to abut the end of the tube against the body member, it will be apparent that it may be spaced slightly away from the body member and the tightening of the nut will deform the sealing gasket so as to establish the seal and it will also contract the gripping portion of the sleeve into tight engagement with the tube.

The fingers 16 being cut away adjacent the cutting edge as indicated at 19, assures that when the fingers are contracted by the nut camming surface 8, only the cutting edge 18 will bite or dig into the tube. It will be seen from Figure 2 that while the cutting edge 18 firmly grips the tube, the remaining portion of the finger is maintained out of contact therewith.

In the modified form shown in Figure 3, the body member 1 has its inner end formed with a relatively shallow tapered counterbore 20 in which is received the tube 4. The distance in which the tube enters the counterbore is very slight. However, it functions to locate the tube centrally of the body member and the taper feature permits endwise movement of the tube 4 and sleeve 10 in unison should the fingers 16 bite into the tube before the sleeve has deformed the gasket ring 15 and the wall 11 moved into engagement with the inner end of the body member. The nut, holding sleeve and gasket are identical in construction with the preferred form and the operation is the same as above described.

It is obvious that many changes in the details of construction may be made without departing from the spirit of the invention as set forth in the appended claims.

I claim:

1. A coupling for tubes comprising a body member having a bore therethrough, a nut having threaded engagement with the body member and provided with an opening through which a tube may be extended, the wall of said opening being shaped so as to provide a camming surface, a sleeve disposed within the nut and having the inner portion thereof offset outwardly to form a recess for a sealing gasket, a gasket of deformable material disposed in said recess, said body having at its outer end a transverse face surrounding said bore and against which said gasket and said offset portion of the sleeve are adapted to abut, said sleeve having a part extending rearwardly of said offset portion and adapted to be cammed radially inwardly against the tube for gripping the same when the nut is threaded on to the body member, said gasket and said offset portion being so dimensioned that when the gasket initially abuts the body face the offset portion will be spaced a slight distance from said face, said sleeve being adapted to be moved forward under the action of the nut whereby the gasket will be pressed into sealing engagement with the body and the tube and said offset portion will be moved into abutting relation with said body face to limit the deformation of the gasket.

2. A coupling for tubes comprising a body member having a bore therethrough, a nut having threaded engagement with the body member and provided with an opening through which a tube may be extended, the wall of said opening being shaped so as to provide a camming surface, a sleeve disposed within the nut and having the inner portion thereof offset outwardly to form a recess for a sealing gasket, a gasket of deformable material disposed in said recess, said body having at its outer end a transverse face surrounding said bore and against which said tube, said gasket and said offset portion of the sleeve are adapted to abut, said sleeve having a part extending rearwardly of said offset portion and adapted to be cammed radially inwardly against the tube for gripping the same when the nut is threaded on to the body member, said gasket and said offset portion being so dimensioned that when the gasket initially abuts the body face, the offset portion will be spaced a slight distance from said face, said sleeve being adapted to be moved forward under the action of the nut whereby the gasket will be pressed into sealing engagement with the body and the tube and said offset portion will be moved into abutting relation with said body face to limit the deformation of the gasket.

3. A coupling for tubes comprising a body member having a bore therethrough, a nut having threaded engagement with the body member and provided with an opening through which a tube may be extended, the wall of said opening being shaped so as to provide a camming surface, a sleeve disposed within the nut and having the inner portion thereof offset outwardly to form a recess for a sealing gasket, a gasket of deformable material disposed in said recess, said body having at its outer end a transverse face surrounding said bore and against which said gasket and said offset portion of the sleeve are adapted to abut, said sleeve having a part extending rearwardly of said offset portion and provided with inwardly projecting portions terminating in sharp cutting edges, said rearwardly extending parts of the sleeve being adapted to be cammed radially inwardly against the tube for gripping the same when the nut is threaded on to the body member, said gasket and said offset portion of the sleeve being so dimensioned that when the gasket initially abuts the body face the offset portion will be spaced a slight distance from said face, said sleeve being adapted to move forward under the action of the nut whereby said gasket will be pressed into sealing engagement with said body and tube and said offset portion will be moved into abutting relation with said body face to limit the deformation of the gasket.

4. A coupling for tubes comprising a body member having a bore therethrough, a nut having threaded engagement with the body member and provided with an opening through which a tube may be extended, the wall of said opening being shaped so as to provide a camming surface, a sleeve disposed within the nut and having an inner portion thereof offset outwardly to form a recess for a sealing gasket, a gasket of deformable material disposed in said recess, said body having at its outer end a transverse face surrounding said bore and against which said gasket and said offset portion of the sleeve are adapted to abut, said sleeve having a part extending rearwardly of said offset portion and provided with inwardly projecting portions terminating in sharp cutting edges, said rearwardly extending parts of the sleeve being adapted to be cammed radially inwardly against the tube for gripping the same when the nut is threaded on to the body member, said gasket and said offset portion of the sleeve being so dimensioned that when the gasket initially abuts the body face the offset portion will be spaced a slight distance from said face, said sleeve being adapted to move forward under the action of the nut whereby said gasket will be pressed into sealing engagement with said body and tube and said offset portion will be moved into abutting relation with said body face to limit the deformation of the gasket, said sleeve being of less diameter than the threaded connection between the nut and the body member so as to permit said nut to be removed from the body member without disturbing the connection of the sleeve to the tube.

JOHN N. WOLFRAM.

REFERENCES CITED

The following references are of record in the file of this patent:

UNITED STATES PATENTS

| Number | Name | Date |
|---|---|---|
| 1,563,836 | Copp | Dec. 1, 1925 |
| 2,069,177 | Craver | Jan. 26, 1937 |
| 2,230,116 | Kreidel | Jan. 28, 1941 |
| 2,412,664 | Wolfram | Dec. 17, 1946 |

FOREIGN PATENTS

| Number | Country | Date |
|---|---|---|
| 379,413 | Great Britain | Sept. 1, 1932 |